United States Patent
Papadopoulos et al.

(10) Patent No.: US 7,187,768 B1
(45) Date of Patent: Mar. 6, 2007

(54) APPARATUS FOR CORD-FREE HANDS-FREE TELEPHONY

(75) Inventors: Costas Papadopoulos, Acton, MA (US); Richard W. Hale, Falmouth, MA (US)

(73) Assignee: VXI Corporation, Rollinsford, NH (US)

( * ) Notice: Subject to any disclaimer, the term of this patent is extended or adjusted under 35 U.S.C. 154(b) by 89 days.

(21) Appl. No.: 10/793,245

(22) Filed: Mar. 4, 2004

(51) Int. Cl.
*H04M 1/72* (2006.01)

(52) U.S. Cl. ............................ 379/428.02; 455/575.2

(58) Field of Classification Search ............... 379/441, 379/442, 373.01, 419, 420, 422, 430, 447, 379/448, 450; 455/567, 575.2
See application file for complete search history.

(56) References Cited

U.S. PATENT DOCUMENTS

| | | | | |
|---|---|---|---|---|
| 5,426,689 A | * | 6/1995 | Griffith et al. | 455/575.2 |
| 6,078,825 A | * | 6/2000 | Hahn et al. | 455/569.2 |
| 2004/0266349 A1 | * | 12/2004 | Wang | 455/41.2 |

OTHER PUBLICATIONS

"Hello Direct: Cordless XLT User Guide," Hello Direct, Inc. San Jose CA. 1998.
"Olympia: Bluetooth Two Line." User Guide. Olympia Phones.
"Plantronics, Cordless Headset Telephone" Product Information Booklet. Plantronics, Inc. Santa Cruz, CA. 2003.

* cited by examiner

*Primary Examiner*—Sinh Tran
*Assistant Examiner*—Walter F Briney, III
(74) *Attorney, Agent, or Firm*—Gauthier & Connors LLP

(57) ABSTRACT

A telephone line interface includes a ring detect circuit for activating a RF transceiver and thereby notifying the RF headset of a ringing condition on a telephone line. A wire conversion circuit separates transmit voice signals from receive voice signals and provides the separated voice signals to the RF transceiver. A firmware allows the electronic hook switch to go off hook only when the line is ringing or only when the line is off hook.

13 Claims, 4 Drawing Sheets

APPARATUS FOR CORD-FREE HANDS-FREE TELEPHONY

BACKGROUND OF THE INVENTION

The present invention relates to the field of short distance wireless telephony, and in particular to an apparatus that links a wireless headset with a Central Office telephone line.

FIG. 1 illustrates the prior art configuration most commonly used for hands-free telephony at the consumer level. A cordless phone base 102 is connected to wall jack 101 and thence to a Central Office telephone line. For hands-free operation, it is necessary that the cordless phone handset 103 be equipped with a headset jack with the customary 3 wire interface to a corded headset 104. Three connections, i.e. mic, earphone and common are brought respectively to the tip, ring and sleeve terminals of a 2.5 mm plug at the end of the headset cord. A ringer is fitted in both the base and the handset whereas a keypad with several buttons for going off hook, dialing and terminating a call is found on the handset. The user of this prior art system is twice encumbered, first by having to deal with the headset cord in awkward situations and then by having to raise the handset from waist level in order to operate the buttons.

The cost of such cordless phones today is low and the FCC spectrum allocations sufficient for the needs of the broad consumer market. Newer cordless handsets may come equipped with a headset jack for the added facility of hands-free operation once a headset is plugged into this jack on the RF handset. The headset may either be bundled with the phone or it may be sold separately. Such a headset is likely to be configured for positioning over the head via a headband or over the ear via an earhook and fitted with a receiver at the ear and a microphone boom toward the mouth. When a cordless handset is thus connected to a headset, the user will likely clip the handset to his or her belt and a cord from the headset will span the distance from the waist to the ear. Clearly then the microphone and receiver in the cordless handset are made redundant when such a headset is employed. Furthermore the handset is physically larger than it would be if it had no built-in mic and receiver.

Cordless headset phones are available to satisfy the requirement for cordless telephony without the added bulk of redundant mic and receiver transducers in the handset. An exemplary product is the CT-12 Cordless Headset Telephone by Plantronics, Inc. The package for CT12 includes a base unit, a "remote" module with belt clip and a headset with cord. The base connects to a CO phone line and to AC power and also provides for charging of the batteries in the "remote." It is evident that although this product is suitable for hands-free telephony over a RF link, it fails to offer a wire-free solution and requires that the user wear a belt or find other means for carrying the "remote." The headset cord from the CT12 belt-worn "remote" module to the ear will likely snag when the wearer interacts with children or performs household activities.

Other headsets are wireless and self contained in order to overcome the limitations of a beltpack with a cord to the headset. An exemplary product is the XLT Headset by Hello Direct, Inc. However, the XLT is not a true telephone but has a base unit which must connect to the handset port of a preinstalled corded telephone. Said differently, the XLT is a wireless headset substituting for the wired handset on a particular telephone set. The XLT user has to physically access, i.e. touch, this telephone for going off hook, dialing etc. Handset port wiring of telephone sets is not standardized. The receive and transmit pair connections from the handset to the phone are likely to vary among manufacturers. Therefore a complex "learning" process must be invoked in order to configure the interface to the handset port correctly.

RF headsets without base units are also available. When those are based on the Bluetooth specification instead of a proprietary RF link, they are interoperable with other Bluetooth enabled devices such as cellular handsets, computers and automobiles. Such Bluetooth headsets however are not connectable to a Central Office line unless they are optionally added to a system with a dedicated Bluetooth base unit and a Bluetooth handset with facilities for dialing, ringing, charging of the handset batteries etc. An exemplary product is the Olympia 2.4 GHz 2-Line Bluetooth Cordless Data Phone. It will be appreciated that Olympia is a complex system that must be purchased and installed before a user can enjoy the benefits of cord-free hands-free operation and do so only after a Bluetooth headset is added to the system.

SUMMARY OF THE INVENTION

According to one aspect of the invention, there is provided a telephone line interface for use with a self-contained RF headset. The interface includes a ring detect circuit for activating a RF transceiver and thereby notifying the RF headset of a ringing condition on a telephone line. A wire conversion circuit separates transmit voice signals from receive voice signals and provides the separated voice signals to the RF transceiver. A firmware allows the electronic hook switch to go off hook only when the line is ringing or only when the line is off hook.

According to one aspect of the invention, there is provided a telephone line interface for use with a self-contained RF headset. The interface includes a Bluetooth transceiver and a ring detect circuit for activating the transceiver and thereby notifying the headset of a ringing condition on a telephone line. An electronic hook switch is responsive to a signal from the headset. A wire conversion circuit separates transmit voice signals from receive voice signals and provide the separated voice signals to the transceiver. Moreover, the interface includes an off hook detect circuit. A firmware allows the electronic hook switch to go off hook only when the line is ringing or only when the line is off hook.

DETAILED DESCRIPTION OF THE INVENTION

Figure 1:
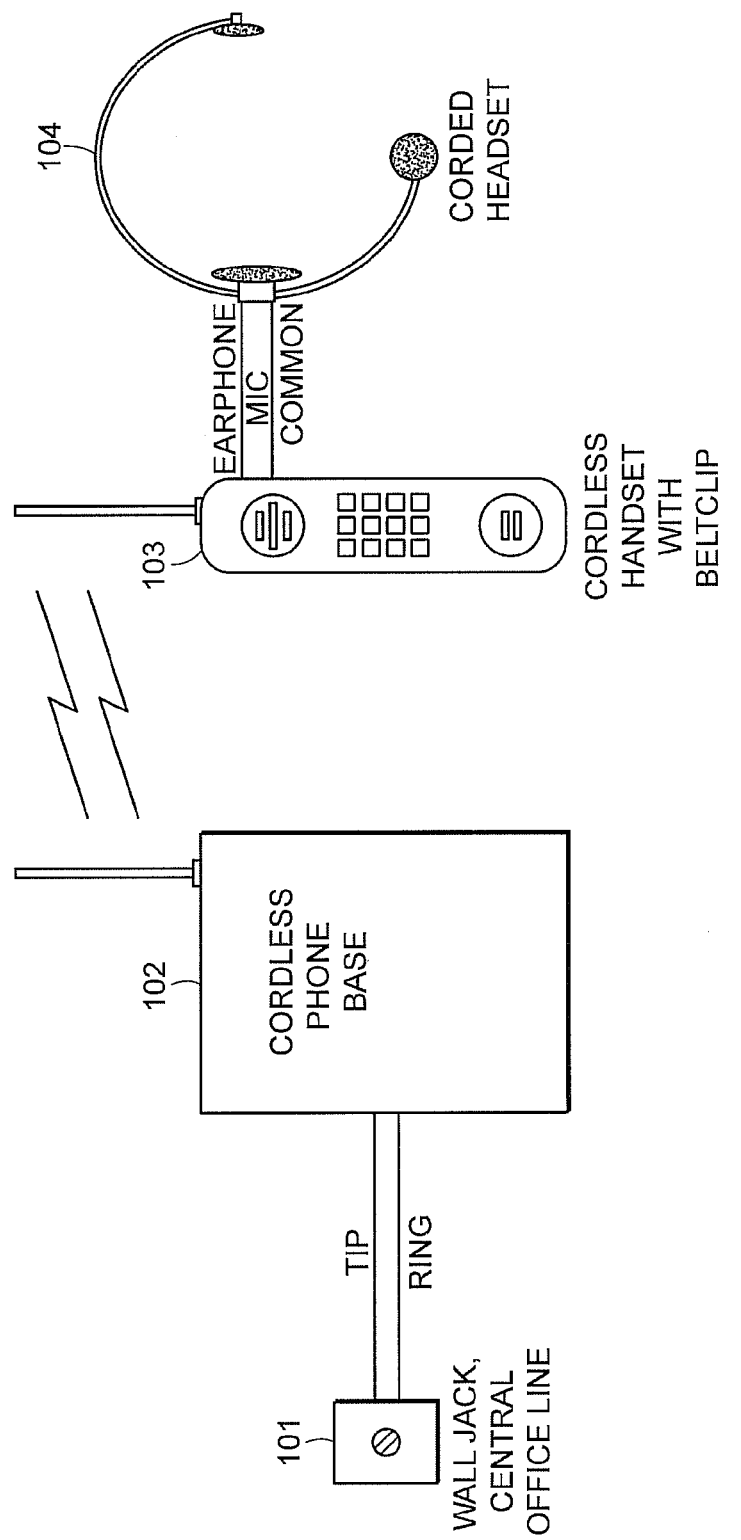
FIG. 1 is a schematic block diagram illustrating a prior art cordless phone connected to a corded headset.
Figure 2:
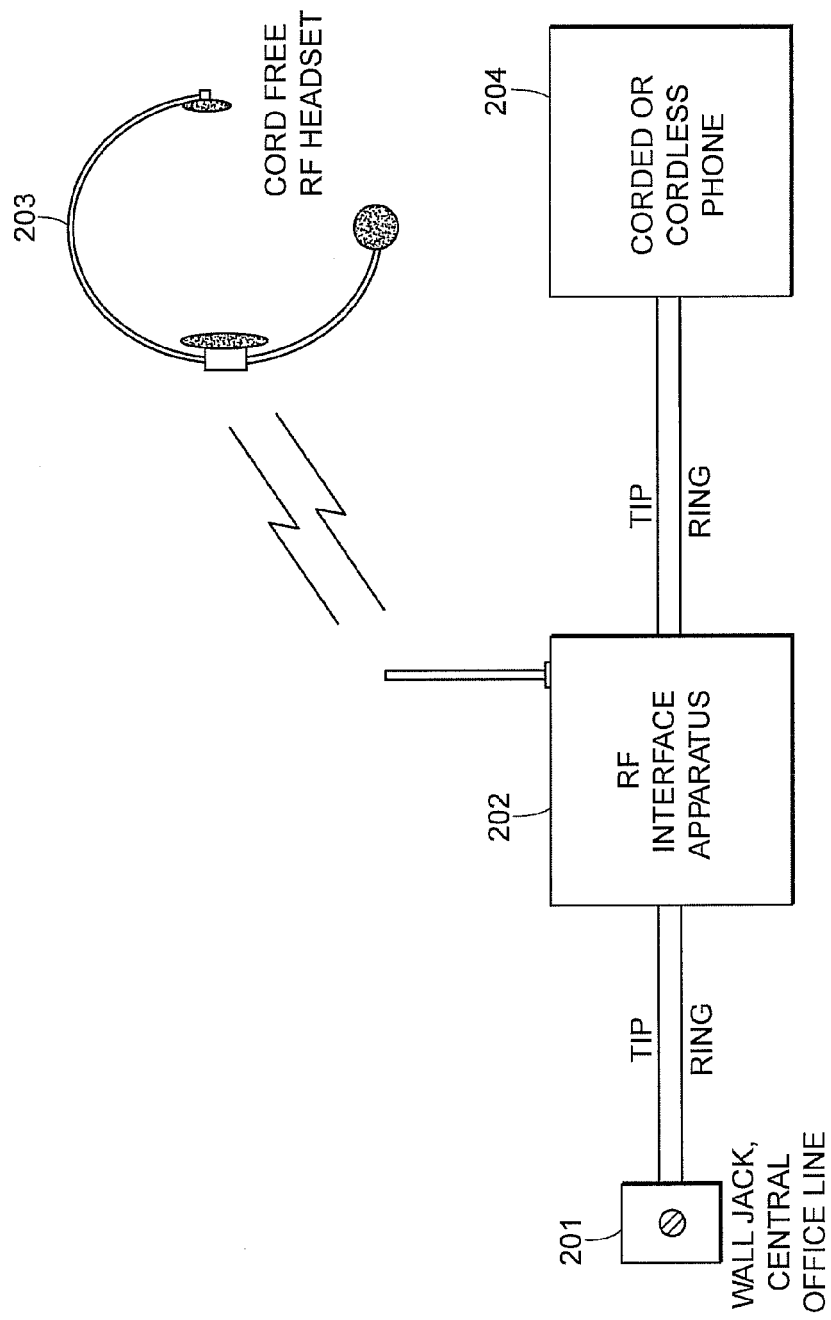
FIG. 2 is a schematic block diagram illustrating the connection of the RF headset and RF interface apparatus to any CO telephone.

FIG. 2 illustrates a system 200 with a RF Interface Apparatus 202 of the present invention interposed between CO wall jack 201 and telephone 204. RF Headset 203 is self contained and will be described later with reference to FIG. 3. Headset 203 and Interface 202 communicate over a low power RF link and preferably a Bluetooth link at 2.4 GHz, however, other RF links having low power for transmitting over short distances can also be used. The system 200 will function as an adjunct to any CO telephone, corded or cordless suited to the user's preference.

Figure 3:
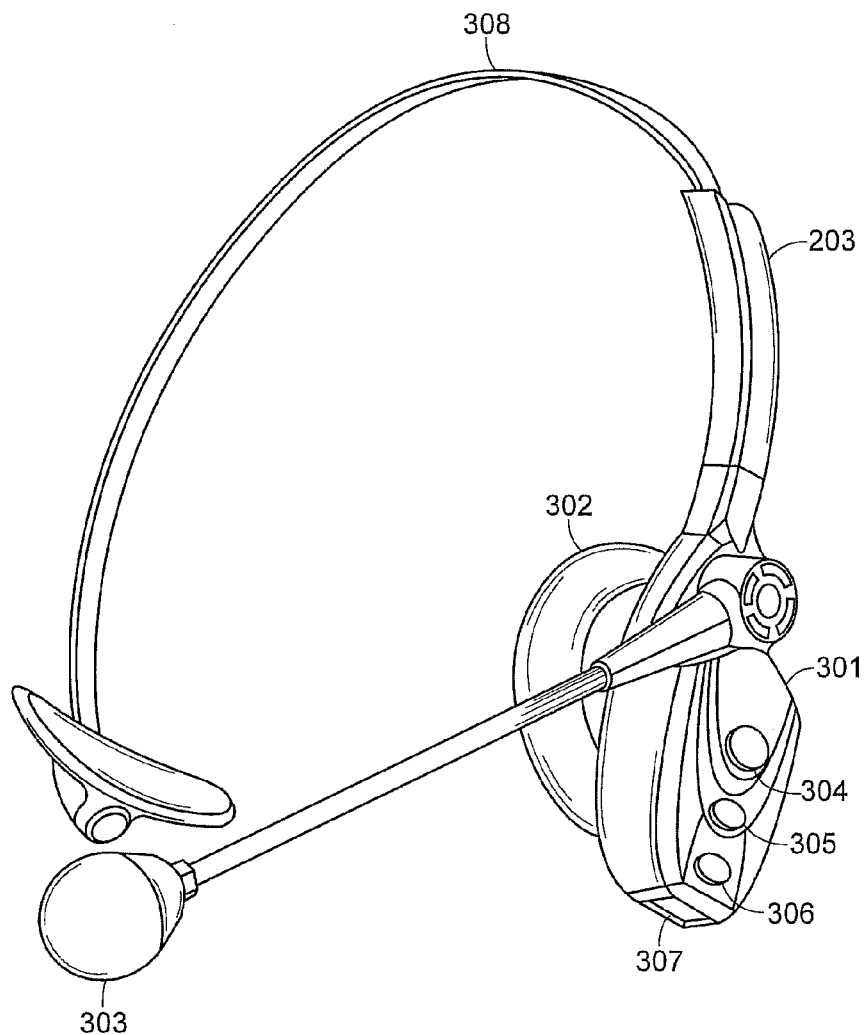
FIG. 3 is a schematic block diagram illustrating the external components and controls of the RF headset of FIG. 2.

RF Headset 203, as shown in FIG. 3, can be configured for over the head use with headband 308 as shown or can be fitted with an earhook instead of the headband. Receiver 302 and microphone 303 are connected to electronic module 301. This module houses the batteries, the antenna and RF transceiver, also circuits for audio functions and programmable logic. A momentary switch under multi-function button (or MFB) 304 is used for answering or ending calls.

MFB 304 is backlighted by LEDs that indicate whether the headset is in pairing mode, on standby, on a call or off. Receive volume is adjusted by up button 305 or down button 306. In fact, all functions and features of the headset other than setting the volume are engaged with the MFB, which is located and shaped for quick, intuitive access with one finger toward the "middle" of the ear. Such MFB functions include Bluetooth pairing, power on off, flash and so forth. The batteries are replenished when a charger is inserted at port 307. The charger may well be part of RF Interface Apparatus 202, as shown in FIG. 2, with a recess to accept the lower portion of RF Headset 203 and a mating connector for charging port 307.

Figure 4:
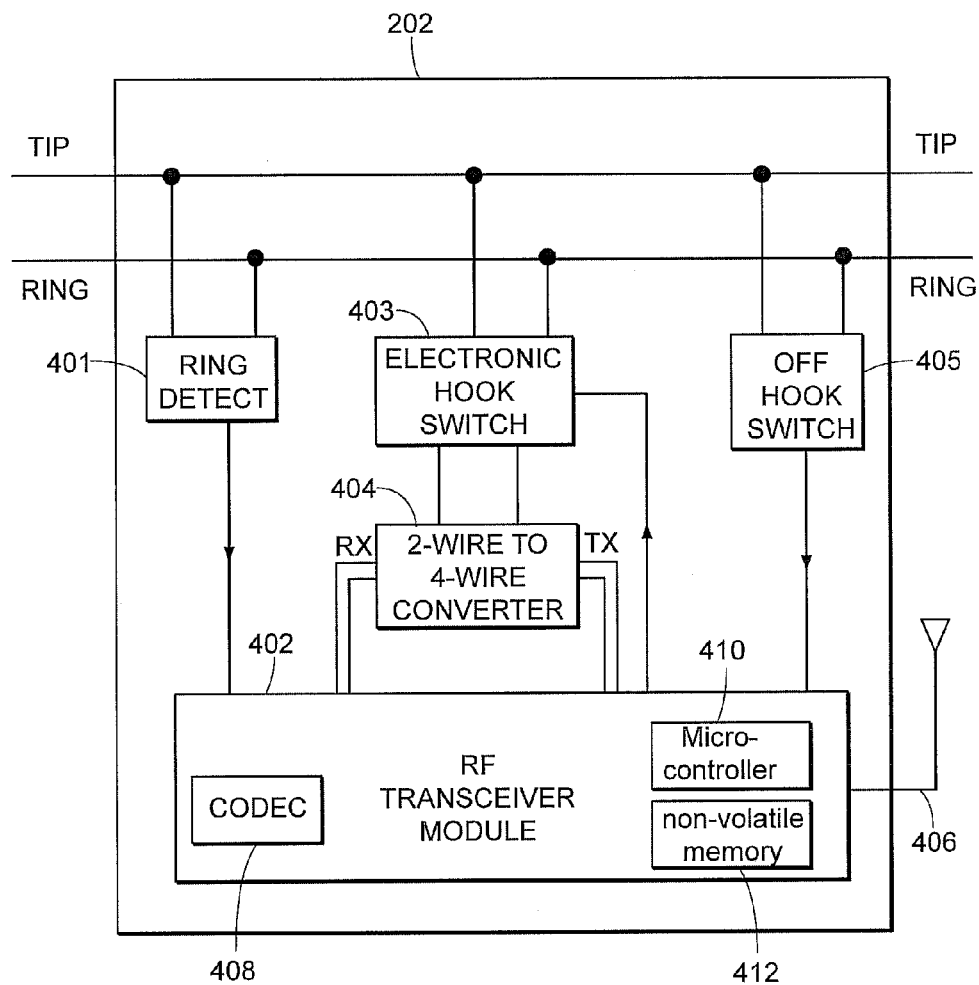
FIG. 4 is a schematic block diagram illustrating the RF interface apparatus of FIG. 2.

FIG. 4 is a schematic block diagram of the RF Interface Apparatus 202 of the present invention. In broad terms, one side of the apparatus operates as a CO phone and the other as a Bluetooth audio gateway. Three operating modes will be described with reference to the circuit stages of FIG. 4: answer, join a call, terminate a call. A fourth mode, i.e. initiating a call by dialing is not supported, for it requires a dialpad and defeats the purpose of a self-contained streamlined headset. When a Central Office ringing signal appears on the tip and ring pair, it is sensed by Ring Detect 401 and results in a logic level shift that in turn "notifies" RF Transceiver Module 402, such Windigo Systems BTM02C2XX-R. The RF Transceiver Module 402 also includes CODEC circuits 408 and a microcontroller 410 with a non-volatile memory 412. This memory 412 is programmed at the factory with Bluetooth audio gateway firmware.

The microcontroller 410 initiates a transmit sequence to the headset, whereby the user is notified by an audible tone in the earphone, indicative of the ringing condition. If the user wishes to answer, he or she will respond by pressing MFB 304, as shown in FIG. 3. A coded signal will then be transmitted by the headset, received by Module 402 and decoded by the firmware to activate Electronic Hook Switch 403 and thereby go off hook. A relay with DPDT contacts and low coil voltage is the preferred component for the function of Electronic Switch 403. At this point the call is answered and the user is connected. The voice signals on the tip and ring pair are separated into TX and RX components by 2-Wire to 4-Wire Converter 404 comprising either a hybrid transformer or a speech network IC, for example, Motorola MC34114. The TX and RX pairs are then fed to Module 402. The RX signal is digitized by the CODEC 408 and formatted for Bluetooth transmission via antenna 406 to the RF headset, thereby heard at the earphone. Similarly in the reverse direction, when a headset mic signal is digitized and transmitted, it arrives at antenna 406, is then demodulated, converted to analog again by the CODEC 408 and brought to the TX terminals of Converter 404.

A second mode of operation, i.e. joining a call in progress or transferring a call from a preinstalled CO phone to the RF headset is enabled by the remaining circuit block in FIG. 4, Off Hook Detect 405. This stage monitors the tip and ring pair and indicates to Module 402 whether the line is indeed off hook. When the user of the RF headset of the present invention presses MFB 304, as shown in FIG. 3, and the line is off hook, then and only then the firmware in Module 402 throws Switch 403 off hook and sends the call to the headset. Since the RF headset has no dialpad, the system never allows a response from the MFB to take Switch 403 off hook unless the phone line is already ringing or already off hook. This prevents the uncalled-for circumstance of obtaining dialtone without facilities for dialing.

A third mode of operation tears down a call and returns Electronic Hook Switch 403 to the on-hook condition. As before with respect to answering or transferring a call to the headset, this third mode is also engaged by a press of the momentary MFB at the headset. It is understood in the art that at all times and in all operating modes, RF Interface Apparatus 202 complies with all telephone line requirements specified by the FCC in CFR Title 47 Part 68 and therefore incorporates all necessary protection and limiting components. It is also known to persons skilled in the art that RF Headset 203 and RF Apparatus 202 must both comply with CFR Title 47 Part 15 for low power unlicensed RF devices. Although devices built to the Bluetooth specification are FCC compliant in principle, there are opportunities for unwanted emissions at other frequencies (for instance at the synthesizer clock frequency).

It will be noted in FIG. 4 that the tip and ring wire pair 414 passes through apparatus 202 with no interruption. It is thus made clear that there is no requirement to interpose the base apparatus of the present invention on the telephone cord between a wall jack and a preinstalled CO phone. It is only a practical matter of convenience when wall jacks are scarce, otherwise the apparatus may be connected to the CO line anywhere on the premises.

While a power supply is not shown in FIG. 4, it is known to persons skilled in the art that RF Interface Apparatus 202 requires a power supply such as the familiar AC wall adaptor with low voltage DC output. The same power supply will recharge the batteries in RF Headset 203 when Apparatus 202 is fitted with a suitable charging port.

Although the present invention has been shown and described with respect to the illustrative embodiment, various changes, omissions, and additions to the detail thereof, may be made therein, without departing from the spirit and scope of the invention.

The invention claimed is:

1. A telephone line interface for directly connecting a RF headset with a central office telephone line having a tip and ring arrangement, said interface comprising:
   a ring detect circuit that is directly coupled to said tip and ring arrangement and activates a RF transceiver once said ring detect circuit detects a ringing condition on said tip and ring arrangement, and thereby notifying said RF headset of said ringing condition on said central office telephone line;
   a wire conversion circuit that separates transmit voice signals from receive voice signals and provides said separated voice signals to said RF transceiver;
   an electronic hook switch that is coupled to said tip and ring arrangement, said electronic hook switch goes off hook responsive to a signal from said RF headset; and
   a firmware module that receives a coded signal from said RF headset to activate said electronic hook switch to go off hook only when said central office telephone line is ringing or only when said central office telephone line is off hook, said firmware module also receives said receive voice signals and transmit voice signals and performs the digital processing necessary for communication with said RF headset.

2. The telephone line interface of claim 1, wherein said headset is equipped with a multi function button.

3. The telephone line interface of claim 2, wherein said button is operable to take said interface off hook when said CO line is ringing.

4. The telephone line interface of claim 2, wherein said button is operable to terminate a call and return said interface on hook.

5. The telephone line interface of claim 2, wherein said button is operable to turn said headset on or off.

6. The telephone line interface of claim 1, wherein said RF transceiver and said RF headset communicate over a Bluetooth link.

7. The telephone line interface of claim 6, wherein said multi function button is operable to perform Bluetooth pairing.

8. A telephone line interface for directly connecting a RF headset with a central office telephone line having a tip and ring arrangement, said interface comprising:
- a Bluetooth transceiver;
- a ring detect circuit that is directly coupled to said tip and ring arrangement and activates said transceiver once said ring detect circuit detects a ringing condition on said tip and ring arrangement, and thereby notifying said headset of a ringing condition on said central office telephone line;
- an electronic hook switch that is coupled to said tip and ring arrangement, said electronic hook switch goes off-hook responsive to a signal from said RF headset;
- a wire conversion circuit that separates transmit voice signals from receive voice signals and provides said separated voice signals to said transceiver;
- a firmware module that receives a coded signal from said RF headset to allow said electronic hook switch to go off hook only when said central office telephone line is ringing or only when said central office telephone line is off hook, said firmware module also receives said receive voice signals and transmit voice signals and performs the digital processing necessary for communication with said RF headsets; and
- an off hook detect circuit that is coupled to said tip and ring arrangement, said off hook detect circuit monitors said tip and ring arrangement and indicates to said firmware module whether the central office line is off hook.

9. The telephone line interface of claim 8, wherein said headset is equipped with a multi function button.

10. The telephone line interface of claim 9, wherein said button is operable to take said interface off hook when said line is ringing.

11. The telephone line interface of claim 9, wherein said button is operable to terminate a call and return said interface on hook.

12. The telephone line interface of claim 9, wherein said button is operable to turn said headset on or off.

13. The telephone line interface of claim 9, wherein said multi function button is operable to perform Bluetooth pairing.

* * * * *